United States Patent
Gorodisher et al.

(10) Patent No.: US 9,840,591 B2
(45) Date of Patent: Dec. 12, 2017

(54) METHOD OF PREPARING BENZOXAZINE-THIOL POLYMERS FILMS

(75) Inventors: Ilya Gorodisher, Stillwater, MN (US); Michael A. Johnson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 891 days.

(21) Appl. No.: 13/813,306

(22) PCT Filed: Aug. 2, 2011

(86) PCT No.: PCT/US2011/046177
§ 371 (c)(1),
(2), (4) Date: Feb. 21, 2013

(87) PCT Pub. No.: WO2012/018753
PCT Pub. Date: Feb. 9, 2012

(65) Prior Publication Data
US 2013/0140738 A1 Jun. 6, 2013

Related U.S. Application Data

(60) Provisional application No. 61/370,688, filed on Aug. 4, 2010.

(51) Int. Cl.
*B29C 39/16* (2006.01)
*C08G 75/14* (2006.01)
(Continued)

(52) U.S. Cl.
CPC .............. *C08G 75/14* (2013.01); *B29C 39/16* (2013.01); *C08G 73/06* (2013.01); *C08J 5/18* (2013.01);
(Continued)

(58) Field of Classification Search
CPC .............. B29C 39/16; B29K 2105/243; B29K 2079/00; B29K 2081/00; C08G 73/06; C08J 5/18; C08J 2379/02
(Continued)

(56) References Cited

U.S. PATENT DOCUMENTS 4,118,377 A  10/1978  D'Alelio
4,181,752 A   1/1980  Martens
(Continued)

FOREIGN PATENT DOCUMENTS

CN   101360788   2/2009
JP   2001-187362   7/2001
(Continued)

OTHER PUBLICATIONS

Wu, et al., "Synthesis and Insecticidal Activity of Oxazaphospholidines, Oxathiaphospholanes, and Thiazaphospholidines," Agric. Biol. Chem., vol. 52, (11), 1988, pp. 2911-2917.
(Continued)

*Primary Examiner* — Seyed Masoud Malekzadeh
(74) *Attorney, Agent, or Firm* — Kent S. Kokko

(57) ABSTRACT

A process for preparing benzoxazine-thiol polymer film is described comprising forming a rolling bank of a curable composition comprising a polybenzoxazine and a polythiol, wherein the rolling bank contacts first and second carrier substrates; passing the first and second substrates with the curable composition therebetween through a nip; and at least partially curing the curable composition to provide the corresponding polymeric layer. The compositions are useful in coating, sealants, adhesive and many other applications.

26 Claims, 1 Drawing Sheet

(51) Int. Cl.
*C08G 73/06* (2006.01)
*C08J 5/18* (2006.01)
*B29K 79/00* (2006.01)
*B29K 81/00* (2006.01)
*B29K 105/24* (2006.01)

(52) U.S. Cl.
CPC ...... *B29K 2079/00* (2013.01); *B29K 2081/00* (2013.01); *B29K 2105/243* (2013.01); *C08J 2379/02* (2013.01); *Y02P 20/582* (2015.11)

(58) Field of Classification Search
USPC .......................................................... 264/280
See application file for complete search history.

(56) References Cited

U.S. PATENT DOCUMENTS

| | | |
|---|---|---|
| 5,543,516 A | 8/1996 | Ishida |
| 5,741,542 A | 4/1998 | Williams |
| 6,160,042 A * | 12/2000 | Ishida ............... C08K 9/04 423/290 |
| 6,207,786 B1 | 3/2001 | Ishida |
| 6,376,080 B1 | 4/2002 | Gallo |
| 6,620,905 B1 | 9/2003 | Musa |
| 6,676,754 B1 | 1/2004 | Fleming |
| 7,041,772 B2 | 5/2006 | Aizawa |
| 7,053,138 B2 | 5/2006 | Magendie |
| 7,517,925 B2 | 4/2009 | Dershem |
| 7,649,060 B2 | 1/2010 | Li |
| 8,128,779 B2 | 3/2012 | Ho |
| 8,383,706 B2 | 2/2013 | Gorodisher |
| 8,389,758 B2 | 3/2013 | Gorodisher |
| 2004/0261660 A1* | 12/2004 | Li ....................... C08G 61/122 106/287.22 |
| 2009/0240003 A1 | 9/2009 | Burns |
| 2010/0307680 A1* | 12/2010 | Gorodisher ......... C08G 73/06 156/311 |
| 2010/0312004 A1* | 12/2010 | Gorodisher ........... C07C 323/25 560/16 |
| 2011/0027594 A1 | 2/2011 | Johnson |
| 2011/0045306 A1 | 2/2011 | Johnson |
| 2011/0054100 A1 | 3/2011 | Gorodisher |
| 2011/0120646 A1 | 5/2011 | Gorodisher |
| 2011/0130518 A1 | 6/2011 | Gorodisher |
| 2012/0160402 A1 | 6/2012 | Ho |

FOREIGN PATENT DOCUMENTS

| | | | |
|---|---|---|---|
| JP | 2002-196103 | 7/2002 | |
| JP | 2003-001648 | 1/2003 | |
| WO | WO 2008/039658 | 4/2008 | |
| WO | WO 2008/039659 | 4/2008 | |
| WO | WO 2008042883 A2 * | 4/2008 | ............ B32B 27/40 |
| WO | WO 2009/120547 | 10/2009 | |
| WO | WO 2009/120548 | 10/2009 | |
| WO | WO 2010/011705 | 1/2010 | |
| WO | WO 2010/011714 | 1/2010 | |
| WO | WO 2010/141396 | 12/2010 | |
| WO | WO 2011/025652 | 3/2011 | |
| WO | WO 2012/092332 | 7/2012 | |

OTHER PUBLICATIONS

Rimdusit, et al., "Development of new class of electronic packaging materials based on ternary systems of benzoxazine, epoxy, and phenolic Resins," Polymer, vol. 41, Issue 22, Oct. 2000, pp. 7941-7949.

Kimura, et al., "New Thermosetting Resin from Bisphenol A-based Benzoxazine and Bisoxazoline," Journal of Applied Polymer Science, vol. 72, Issue 12, Jun. 1999, pp. 1551-1558.

Ghosh, et al., Polybenzoxazine-New high performance thermosetting resins: Synthesis and properties, Progress in Polymer Science, vol. 32, Issue 11, Nov. 2007, pp. 1344-1391.

* cited by examiner

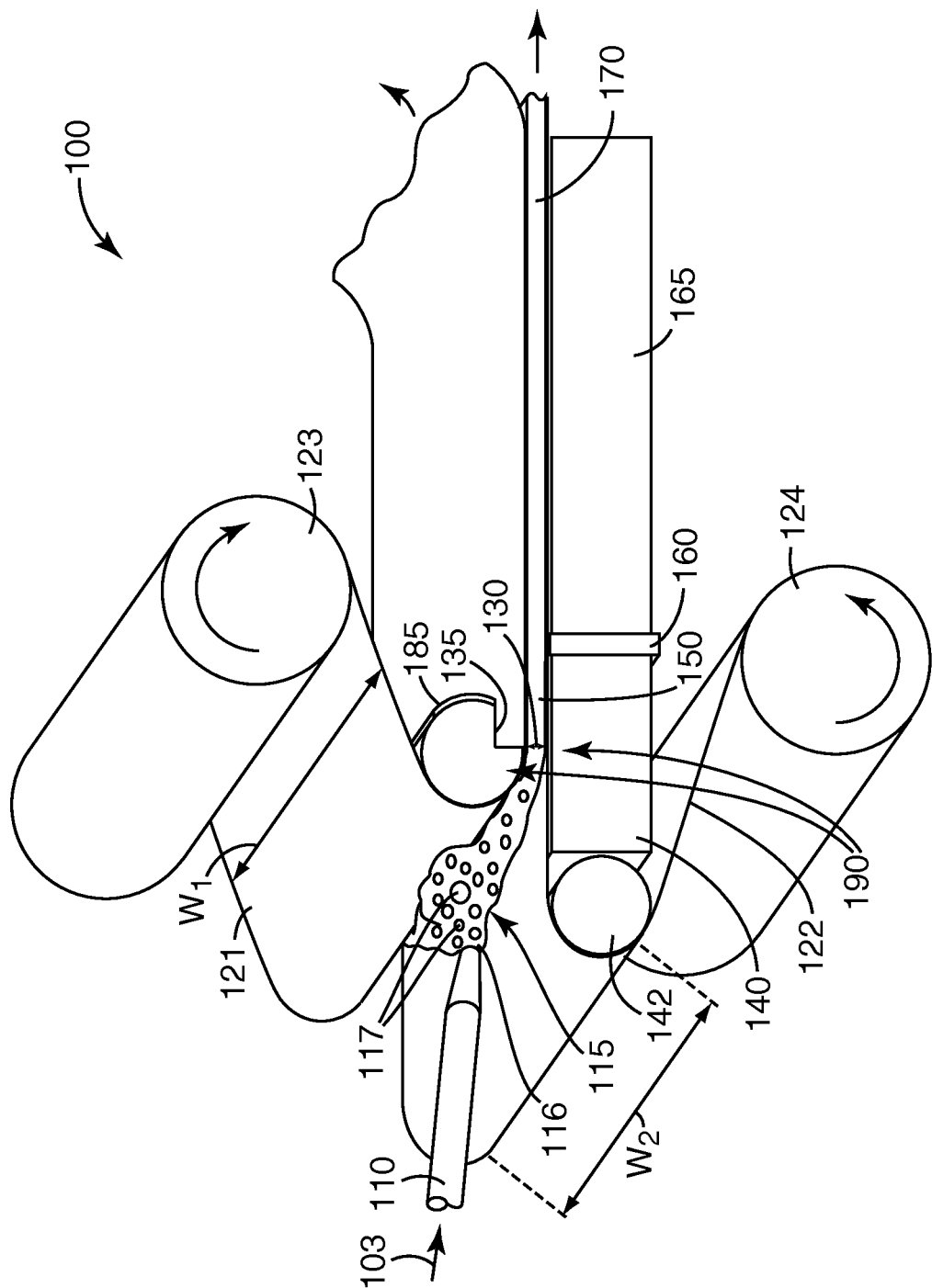

METHOD OF PREPARING BENZOXAZINE-THIOL POLYMERS FILMS

BACKGROUND

Benzoxazines and compositions containing benzoxazine are known (see for example, U.S. Pat. Nos. 5,543,516 and 6,207,786 to Ishida, et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura, et al., "New Thermosetting Resin from Bisphenol A-based Benzoxazine and Bisoxazoline", J. App. Polym. Sci., 72, 1551-58 (1999).

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

SUMMARY

The present disclosure is directed to a method for a benzoxazine-thiol polymer film comprising forming a rolling bank of a curable composition comprising a polybenzoxazine and a polythiol, wherein the rolling bank contacts first and second carrier substrates; passing the first and second substrates with the curable composition therebetween through a nip; and at least partially curing the curable composition to provide the corresponding polymeric layer. The compositions are useful in coating, sealants, adhesive and many other applications.

In some embodiments the benzoxazine-thiol polymer film is derived from aromatic amines, aliphatic amines, or a mixture of the two. It has been found that the respective benzoxazines derived from aromatic and aliphatic amines, respectively, cure at different temperatures allowing the preparation of stagable adhesive compositions.

As used herein the term "benzoxazine" is inclusive of compounds and polymers having the characteristic benzoxazine ring. In the illustrated benzoxazine group, R is the residue of a mono- or polyamine. The term "polybenzoxazine compound" refers to compounds having two or more benzoxazine rings, and is exclusive of benzoxazine homopolymers.

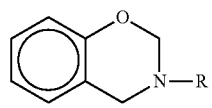

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent.

As used herein, "aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

As used herein the term "residue" is used to define that (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of hexamethylene diamine, $H_2N$—$C_6H_{12}$—$NH_2$ is the divalent alkyl —$C_6H_{12}$—. The residue of phenylene diamine $H_2N$—$C_6H_4$—$NH_2$, is the divalent aryl —$C_6H_4$—. The residue of diamino-polyethylene glycol, $H_2N$—$(C_2H_4O)_{1-20}$—$C_2H_4$—$NH_2$, is the divalent (hetero)hydrocarbyl polyethylene glycol —$(C_2H_4O)H_{1-20}$—$C_2H_4$—.

BRIEF DESCRIPTION OF THE DRAWINGS

FIG. 1 illustrates the process of this description.

DETAILED DESCRIPTION

FIG. 1 illustrates an exemplary process 100 for forming a thin film according to the present invention. Referring now to FIG. 1, reactive components (polybenzoxazine compound and polythiol) 103 are fed into dynamic mixer 110. Alternatively, 110 can be a static mixer. The mixed components combine to form curable composition 116 which is fed to rolling bank 115. The curable composition is maintained in dynamic mixer at temperature sufficient to form a melt.

Rolling bank 115 is disposed between first and second carrier substrates 121, 122 which are unwound from first and second feed rolls 123, 124. First carrier substrate 121 (after passing around roller 142) and second carrier substrate 122 advance toward and pass through nip 190. First and second carrier substrates 121, 122 have respective widths $W_1$ and $W_2$. Rolling bank 115 is medially disposed with respect to widths $W_1$ and $W_2$.

As first and second carrier substrates 121, 122 continuously pass through nip 190 formed by first metering element 140 (a platen) and second metering element 135 (a notch bar), entrapped air bubbles 117 are substantially or completely removed to give thin film of the curable composition 150 sandwiched between first and second carrier substrates 121, 122. First and second metering elements 140, 135 define a nip gap 130.

After passing optional insulation barrier 160, thin reactive film 150 contacts heated platen 165 which facilitates curing of curable composition 116 to form thin film 170 sandwiched between first and second carrier substrates 121, 122. Since the composition 116 generates heat as it reacts, the temperature of the rolling bank rises above ambient temperature. Hence, over time during a continuous process the temperature of rolling bank 115 rises until a steady state temperature is reached that balances heating and cooling effects on the rolling bank.

In some embodiments, the temperature is maintained to effect a complete cure of the curable composition. In some embodiments the temperature is maintained to effect only a partial cure. In some preferred embodiments, which comprise a mixture on an N-aromatic polybenzoxazine and N-aliphatic polybenzoxazine, a first temperature may be selected such that the more reactive N-aliphatic polybenzoxazine is cured or converted at least 50%, preferably at least 75%, while the less reactive N-aromatic polybenzoxazine is cured less than 50%, preferably less than 25%. In such embodiments thin film 170 comprise a B-stageable adhesive, which may be subsequently heated to a higher temperature to effect complete cure.

Until the steady state is reached, the gap typically dynamically changes with time, which results in a thin film of varying thickness and profile. Without wishing to be bound by theory, it is believed that the rising temperature of the rolling bank causes the gap between the metering elements to decrease, with the effect being more pronounced along the medial portions of the metering elements (adjacent the largest mass of the rolling bank) and causing the thickness of the thin film to be larger toward opposite edges than in the middle.

According to the present disclosure, at least a portion, proximate the rolling bank, of at least one of first and second metering elements 140, 135 may be independently heated to a temperature, desirably at or above the contemporaneous temperature of the rolling bank, although less heating may also be used. As exemplified in FIG. 1, this may be accomplished using heating tape 185 secured to element 140. This heating has the effect of reducing the time necessary to reach steady state operation and its attendant start up waste, and optionally thin film uniformity, especially in applications where uniform thickness of the thin film is important.

In some embodiments, (e.g., those wherein one or both of the first and second carrier substrates 121, 122 are both release liners) one or both of the first and second carrier substrates 121, 122 is then removed to expose one or both surfaces of the thin film.

Suitable carrier substrates include those films which have sufficient integrity and flexibility to form and support the reactive thin film. The carrier substrate may have any thickness as long as it has sufficient integrity and flexibility to be used in methods according to the present invention. In general, the films should be substantially continuous and nonporous, although in some cases, some porosity (e.g., microporosity) may be acceptable. Examples of suitable carrier substrates include papers (including treated papers); foils; and polymeric films such as polyester films (e.g., PET polyester films or polycaprolactone films), polycarbonate films, cellulosic films (e.g., cellulose films), polyamide films, polyolefin films (e.g., polyethylene films or polypropylene films), polyamide films, polyimide films, polyvinyl chloride films, or other polymer films; and combinations thereof.

If one or both of the carrier substrates is intended to function as a release liner, it may be treated with a release agent such as, for example, a silicone or a fluorochemical. A wide variety of suitable release liners are known in the art, and many are commercially available.

The first and second metering elements may have any suitable form. Exemplary metering elements include bars, notched bars, rolls, platens, slabs, and knife edges. In general, they should be selected and positioned such that they form a substantially uniform gap prior to formation of the rolling bank.

While methods according to the present invention may be used to form thin films of a variety of thicknesses (e.g., thickness up to 1 millimeter or more), the greatest impact of the method with regard to reducing the time to reach steady state operation will typically be seen with thin films having a thickness of less than about 15 mils (381 micrometers). Accordingly, the first and second metering elements may be positioned such that the gap creates a thin reactive film with a thickness of less than or equal to 15 mils (381 micrometers), 10 mils (254 micrometers), 5 mils (127 micrometers), or even less than or equal to 2 mils (250 micrometers).

At least one of the first or second metering elements may be independently heated, desirably to temperature(s) (including multiple temperatures and gradient temperatures) at or above the temperature of the rolling bank. The first and/or second metering element(s), or portions thereof, may be heated directly or indirectly by any appropriate method including, for example, electrical heating (e.g., by resistive heating coils or a heating tape), steam, or infrared radiation, thermal conduction. Heat may be supplied internally or externally to the first and/or second metering elements. Heating may be provided uniformly on non-uniformly along the length(s) of the first and/or second metering elements. For example, one or both of the ends of the metering element(s) may be independently heated more than the portion of the metering element(s) proximate to the rolling bank.

In general, the temperature of the first and/or second metering elements should not be sufficiently high that excessive curing of the rolling bank occurs. Accordingly, in some embodiments, the temperature of at least a portion of the first and/or second metering elements, proximate the rolling bank, is maintained at temperature(s) less than about 30, 20, 15, 10, 5, or even one degree(s) Celsius (° C.) above the contemporaneous temperature of the rolling bank. In some embodiments, the temperature of at least a portion of the first and/or second metering elements, proximate the rolling bank, is maintained less than about 30, 20, 15, 10, 5, or even one degree(s) Celsius above the temperature of the rolling bank under steady state process conditions (i.e., the steady state temperature).

The present disclosure is directed to a method of preparing novel benzoxazine-thiol polymer films. Such compounds are prepared be the reaction of a polybenzoxazine compound having two or more benzoxazine rings with a polythiol compound. The polymers are characterized as having the characteristic group resulting from ring opening of the oxazine ring with a thiol group and by the sulfanyl-methyl aminophenolic linkage. In the illustrated benzoxazine group, $R^5$ is the residue of a mono- or polyamine, $R^4$ is the residue of a polythiol, and $R^1$ is the residue of an aldehyde. For simplicity the polythiol adduct with a monobenzoxazine compound is illustrated.

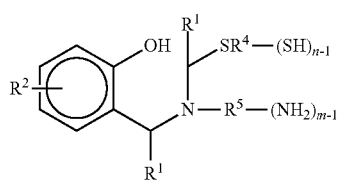

II wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^4$ is the (hetero)hydrocarbyl residue of a thiol compound;
$R^5$ is the (hetero)hydrocarbyl residue of a primary amino compound, which may be a mono- or polyamine.

In the preparation of the benzoxazine-thiol adducts, any polybenzoxazine compound may be used. Benzoxazines may be prepared by combining a phenolic compound, an aliphatic aldehyde, and a primary amine compound. U.S. Pat. No. 5,543,516 (Ishida), hereby incorporated by reference, describes a solventless method of forming benzoxazines. U.S. Pat. No. 7,041,772 (Aizawa et al.) describes a process for producing a benzoxazine resin which comprises the steps of reacting a phenol compound, an aldehyde compound and a primary amine in the presence of an organic solvent to synthesize a benzoxazine resin and removing generated condensation water and the organic solvent from a system under heating and a reduced pressure. Other suitable reaction schemes to produce mono-, di- and higher-functional benzoxazines are described in N. N. Ghosh et al., *Polybenzoxazine-new high performance thermosetting resins: synthesis and properties*, Prog. Polym. Sci. 32 (2007), pp. 1344-1391.

One suitable method of producing the starting benzoxazine compounds is illustrated by the following reaction scheme:

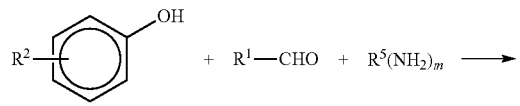 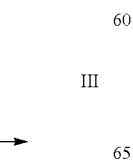

III

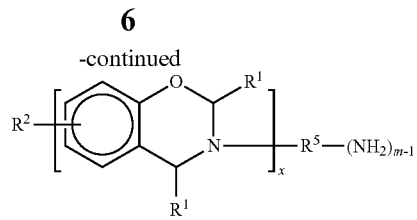

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 2-4; and
x is at least 2.

A monophenol is illustrated for simplicity. Mono- or polyphenolic compounds may be used. The phenolic compound may be further substituted provided such substitution does not deleteriously affect the subsequent reaction with the polythiol. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allylphenol; 4-aminophenol; and the like. Examples of difunctional phenols (polyphenolic compounds) include phenolphthalane; biphenol; 4-4'-methylene-di-phenol; 4-4'-dihydroxybenzophenone; bisphenol-A; 1,8-dihydroxyanthraquinone; 1,6-dihydroxynaphthalene; 2,2'-dihydroxyazobenzene; resorcinol; fluorene bisphenol; and the like. Examples of trifunctional phenols comprise 1,3,5-trihydroxy benzene and the like.

With respect to the $R^2$ group of Formulas II and III, numerous phenolic compounds are contemplated. $R^2$ may be an H, a covalent bond "—" which represents a biphenyl-type phenolic compounds, or $R^2$ may be a divalent aliphatic group linking aryl rings. For example, $R^2$ may be a divalent isopropyl group, derived from bisphenol-A, generally illustrated as follows:

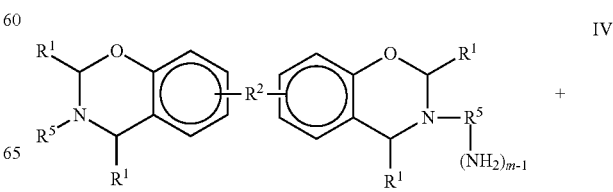

IV

-continued

R⁴(SH)ₙ →

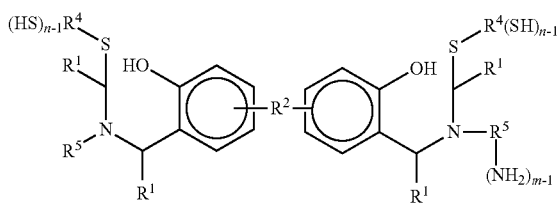

where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^4$ is the (hetero)hydrocarbyl residue of a polythiol compound, where n is at least 2;
$R^5$ is the (hetero)hydrocarbyl residue of a primary amino compound, including mono- and polyamines.

Note that Scheme IV, and other schemes herein, the product depicts free thiol groups. The depiction is used to account for all the thiol groups present in the starting materials, which are available for subsequent reaction. Thus the starting bis-benzoxazine reacts with the polythiol $R^4(SH)_n$, where n is at least 2, and the initial reaction product has "n−1" thiol groups, which may be available for further reaction with additional benzoxazine groups. Further, if the starting benzoxazine was prepared using a polyamine, the $R^5$ groups may be connected to additional benzoxazine groups.

Note that in the above reaction scheme, monoamines are depicted for simplicity, however higher functional amines may also be used to provide the requisite polybenzoxazine having at least two benzoxazine groups. It will be understood that the reaction of polybenzoxazines with a polythiol can provide polymeric materials such as:

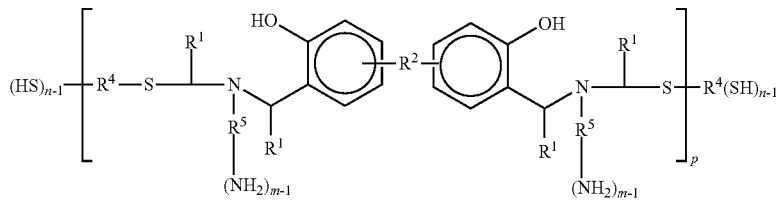

where
each $R^1$ is H or an alkyl group, and is the residue of an aliphatic aldehyde,
$R^2$ is a covalent bond, or a polyvalent (hetero)hydrocarbyl group, preferably a covalent bond or a divalent alkyl group;
$R^4$ is the (hetero)hydrocarbyl residue of a polythiol compound;
$R^5$ is the (hetero)hydrocarbyl residue of a primary amino compound, and
p is at least one, preferably two or more.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted, mono-, disubstituted or higher (hetero)hydrocarbyl amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl. It has been observed that benzoxazines derived from aromatic amines, such as aniline, are less reactive toward the thiol reactants than benzoxazines derived from aliphatic amines as indicated, for example by the corresponding reaction temperatures.

Amines useful in the preparation of the starting benzoxazine compounds include those of the formula $R^5(NH_2)_m$ include (hetero)hydrocarbyl monoamines and polyamines. $R^5$ may be (hetero)hydrocarbyl group that has a valence of m, and is the residue of a mono-, di- or higher amine having at least one primary amine group. $R^5$ can be an alkyl, a cycloalkyl or aryl and m 1 to 4. The $R^5$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polymeric polyoxyalkylene, polyester, polyolefin, poly(meth)acrylate, polystyrene or polysiloxane polymer having pendent or terminal reactive —$NH_2$ groups. Useful polymers include, for example, amine-terminated oligo- and poly-(diaryl)siloxanes and (dialkyl)siloxane amino terminated polyethylenes or polypropylenes, and amino terminated poly(alkylene oxides).

Any primary amine may be employed. Useful monoamines include, for example, methyl-, ethyl-, propyl-, hexyl-, octyl, dodecyl-, dimethyl-, methyl ethyl-, and aniline. The term "di-, or polyamine," refers to organic compounds containing at least two primary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least three amino groups, wherein at least one of the three amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N$ (CH$_2$CH$_2$CH$_2$CH$_2$CH$_2$CH$_2$NH)$_{1-10}$H, H$_2$N(CH$_2$)$_3$NHCH$_2$CH=CHCH$_2$NH(CH$_2$)$_3$NH$_2$, H$_2$N(CH$_2$)$_4$NH(CH$_2$)$_3$NH$_2$, H$_2$N(CH$_2$)$_3$NH(CH$_2$)$_4$NH(CH$_2$)$_3$NH$_2$, H$_2$N(CH$_2$)$_3$NH(CH$_2$)$_2$NH(CH$_2$)$_3$NH$_2$, H$_2$N(CH$_2$)$_2$NH(CH$_2$)$_2$NH(CH$_2$)$_2$NH$_2$, H$_2$N(CH$_2$)$_3$NH(CH$_2$)$_2$NH$_2$, C$_6$H$_5$NH(CH$_2$)$_2$NH(CH$_2$)$_2$NH$_2$, and N(CH$_2$CH$_2$NH$_2$)$_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

Many di- and polyamines, such as those just named, are available commercially, for example, those available from Huntsman Chemical, Houston, Tex. The most preferred di- or polyamines include aliphatic di- and triamines or aliphatic di- or polyamines and more specifically compounds with two or three primary amino groups, such as ethylene diamine, hexamethylene diamine, dodecanediamine, and the like.

Other useful amines include amino acids such as glycine, alanine, and leucine and their methyl esters, aminoalcohols such as ethanolamine, 3-aminopropanol, and 4-aminobutanol, polyaminoethers containing ethylene glycol and diethylene glycol (such as Jeffamine™ diamines), and alkenyl amines such as diallylamine and allylmethylamine.

It will be understood that monoamines will cyclize with the aldehyde and phenolic compound to produce monobenzoxazine compounds, while di- or higher amines will cyclize to produce di- and poly-benzoxazine compounds: For example, a diamine (m=2 in the Scheme below) will produce a di-benzoxazine.

IV

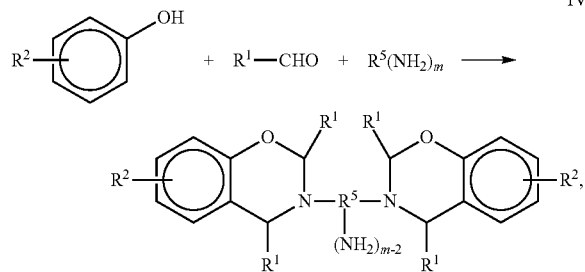

wherein each R$^1$ is H or an alkyl group, and is the residue of an aliphatic aldehyde;
R$^2$ is H, a covalent bond, or a polyvalent (hetero)hydrocarbyl group, preferably H, a covalent bond or a divalent alkyl group;
R$^5$ is the (hetero)hydrocarbyl residue of a primary amino compound.

Polybenzoxazine compounds may be prepared from a polyphenolic compound, such as bisphenol-A, and a mono- or polyamine. These polybenzoxazines may be ring-opened with a polythiol compound, as previous described

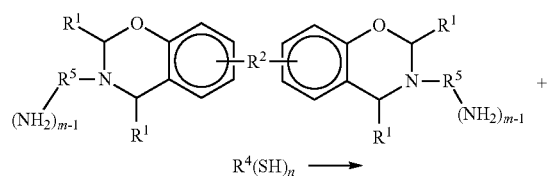

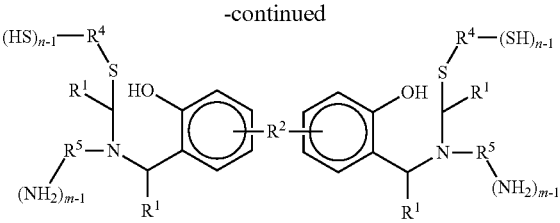

wherein
each R$^1$ is H or an alkyl group, and is the residue of an aliphatic aldehyde,
R$^2$ is H, a covalent bond, or a polyvalent (hetero)hydrocarbyl group, preferably H, a covalent bond or a divalent alkyl group;
R$^4$ is the (hetero)hydrocarbyl residue of a thiol compound, where n is at least 2;
R$^5$ is the (hetero)hydrocarbyl residue of a primary amino compound, including mono- and polyamines.

Polymeric benzoxazines may be prepared from a polyphenolic compound, such as bisphenol-A, and a di- or polyamine. These polybenzoxazines may be ring-opened with a polythiol compound, as previous described

II

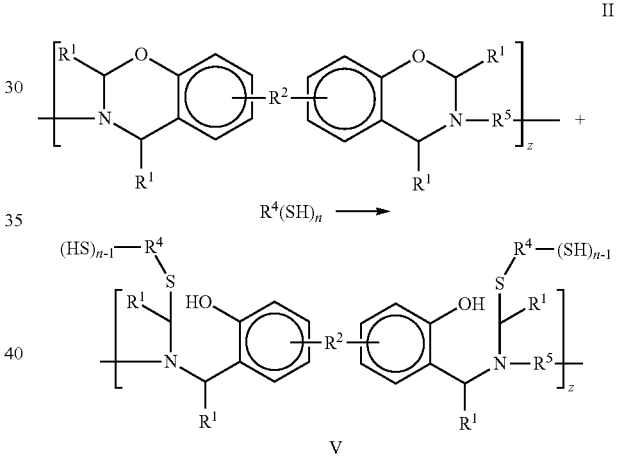

V wherein
each R$^1$ is H or an alkyl group, and is the residue of an aliphatic aldehyde,
R$^2$ is H, a covalent bond, or a polyvalent (hetero)hydrocarbyl group, preferably H, a covalent bond or a divalent alkyl group;
R$^4$ is the (hetero)hydrocarbyl residue of a polythiol compound, where n is at least 2;
R$^5$ is the (hetero)hydrocarbyl residue of a primary amino compound;
z is at least 1, preferably 2 or greater.

Minor amounts of monobenzoxazine compounds may be added to control the molecular weight of the resulting benzoxazine-thiol polymer, or to provide the polymer terminus with a functional group. Such monobenzoxazine compounds may be used in amounts of up to 20% of the molar equivalent of benzoxazine groups of the polybenzoxazine compounds; i.e. up to 20% of all the benzoxazine functional groups may be derived from monothiols. In some embodiments less than 10% of the molar equivalents of benzoxazine groups are derived from monobenzoxazine compounds. In some embodiments less than 1% of the molar equivalents of benzoxazine groups are derived from monobenzoxazine compounds.

The benzoxazine ring is opened with polythiols of the formula $R^4$—$(SH)_n$, where n is 2 to 6. $R^4$ includes any (hetero)hydrocarbyl groups, including aliphatic and aromatic polythiols. $R^4$ may optionally further include one or more functional groups including hydroxyl, acid, ester, cyano, urea, urethane and ether groups. The use of such "functional thiols", having a thiol group and an additional functional group, enable the preparation of benzoxazine-thiol polymers having a functional terminal group available for further reaction.

Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters thereof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate) pentaerythritol tetrakis(3-mercaptopropionate), all of which are commercially available. A specific example of a preferred polymeric polythiol is polypropylene ether glycol bis(3-mercaptopropionate) which is prepared from polypropylene-ether glycol (e.g. Pluracol™ P201, BASF Wyandotte Chemical Corp.) and 3-mercaptopropionic acid by esterification.

Useful soluble, high molecular weight thiols include polyethylene glycol di(2-mercaptoacetate), LP-3™ resins supplied by LP North America. (Houston, Tex.), and Permapol P3™ resins supplied by Products Research & Chemical Corp. (Glendale, Calif.) and compounds such as the adduct of 2-mercaptoethylamine and caprolactam.

Minor amounts of monothiols may be added to control the molecular weight of the resulting benzoxazine-thiol polymer, to plasticize it, or to provide the polymer terminus with a different functional group. While not wishing to be bound by theory, in compositions in which benzoxazine concentration stoichiometrically exceeds that of the thiol, once the thiol groups are consumed in the reaction with benzoxazines, excess benzoxazines are left to react in a phenol (formed during the thiol-benzoxazine reaction) or, optionally, acid-catalyzed benzoxazine homopolymerization. Such monothiols may be used in amounts of up to 20% of the molar equivalent of thiol groups of the polythiol compounds; i.e. up to 20% of all the thiol functional groups may be derived from monothiols. In some embodiments less than 10% of the molar equivalents of thiol groups are derived from monothiol compounds. In some embodiments less than 1% of the molar equivalents of thiol groups are derived from monothiol compounds. It will be appreciated that many commercially available polythiols have minor amounts of monothiols.

Useful alkyl thiols include methyl, ethyl and butyl thiol, as well as 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptopropionic acid, 2-chloroethanethiol, 2-amino-3-mercaptopropionic acid, dodecyl mercaptan, thiophenol, and 2-mercaptoethyl ether.

As will be apparent to one skilled in the art, oligo- or polymeric benzoxazine-thiol polymers may be prepared using polythiols. With respect to Formula VIII, it will be understood that additional polymer branches may result from the free thiol groups

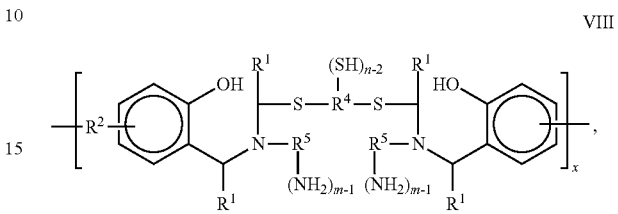

VIII where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^4$ is the (hetero)hydrocarbyl residue of a polythiol compound, where n is at least 2;
x is at least 2, and
$R^5$ is the (hetero)hydrocarbyl residue of a primary amino compound.

The benzoxazine-thiol polymers of Formulas II-VIII may be prepared by combing the polybenzoxazine compounds and the polythiol compounds neat or in a suitable solvent, preferably neat according to the method described herein below. Suitable solvents include those in which the reactants dissolved, preferably at room temperature. Solvents may include that is non-reactive with the reactants and that provides for the subsequent dissolution of co-reactants. Examples of suitable solvents include butyl acetate, toluene, xylene, tetrahydrofuran, ethylene glycol dimethyl ether and the like.

The stoichiometry of the reactants is not critical. Generally any molar ratio of polybenzoxazine to polythiol may be used. Generally the molar amounts ratio of benzoxazine groups to thiol groups is about 1.1:1 to 1:1.1. In some embodiments it is preferable to have an excess of benzoxazine, as an unreacted benzoxazine will homopolymerize to form a coextensive mixture or polymer network of benzoxazine-thiol adduct and benzoxazines polymers. In such embodiments, the molar amounts ratio of benzoxazine groups to thiol groups is about 1.1:1 to 50:1

If desired an acid catalyst may be used to promote the ring-opening of the polybenzoxazine by the polythiol. Both Brönsted and Lewis acidic materials are effective catalysts for the oligomerization. Brönsted acids are classical proton donating materials, and useful catalysts are relatively highly acidic possessing pKa's of less than about 1.2. Useful Brönsted acid catalysts include sulfuric acid, hydrogen chloride, hydrogen bromide, hydrogen iodide, trifluoroacetic acid, trichloroacetic acid, trifluoromethanesulfonic acid, p-toluenesulfonic acid, perchloric acid, and ethanesulfonic acid. Useful Lewis acids (which broadly encompass Brönsted acids in their role as electron pair acceptors) include aluminum chloride, zinc chloride, boron trifluoride, antimony pentachloride, titanium tetrachloride, and iodine. In general the rate of oligomerization is directly related to acid strength of the catalyst. Acid catalysts may be used in amounts of 2 wt. % or less, preferably 1 wt. % or less, most preferably 0.5 wt. % or less, relative to the amounts of benzoxazine and thiol reactants.

In some embodiments, the present disclosure provides "B-stageable" adhesive films. Processing applications such as printed circuit manufacture often employ "stageable" adhesives, that is, adhesive compositions which can be partially cured to a tacky or tack-free coating, fastened to an adherend, and cured using heat, pressure, or both (see U.S. Pat. No. 4,118,377). The tack-free state is sometimes referred to as the "B-Stage".

The present disclosure provides stageable adhesive compositions comprising a blend or mixture of a polythiol compound, and benzoxazine compounds derived from an aromatic amine and benzoxazine compounds derived from an aliphatic amine. The stageable adhesive composition may be coated on to an adherend or substrate, and fully cured to a structural or semistructural adhesive using heat.

Upon combing the components the polythiol compounds will preferentially react with the benzoxazine derived from an aliphatic amine to form a partially cured mixture. This partially cured mixture may be tacky or non-tacky at room temperature. On heating, the benzoxazine derived from an aromatic amine will react with the remaining thiol groups to produce a fully cured adhesive.

The physical properties (e.g. viscosity, tack, peel, shear) of the uncured, B-staged, and cured compositions to be readily altered through the use of different amounts of each component: the thiol, the benzoxazine compounds derived from an aromatic amine and benzoxazine compounds derived from an aliphatic amine, or through the use of different species of the three components.

In some embodiments, the partially cured, stagable adhesive film, prepared by the method of this disclosure, may be disposed between two substrates (or adherends), and subsequent heated to fully cure the adhesive and effect a structural or semistructual bond between the substrates. In other embodiments, the stagable adhesive composition may be heated to a flowable viscosity to effect coating of a substrate, which may then be joined to a second substrate while still molten and full curing effected.

Therefore the present disclosure provides stagable, structural and semi-structural adhesives. "Semi-structural adhesives" are those cured adhesives that have an overlap shear strength of at least about 0.5 MPa, more preferably at least about 1.0 MPa, and most preferably at least about 1.5 MPa. Those cured adhesives having particularly high overlap shear strength, however, are referred to as structural adhesives. "Structural adhesives" are those cured adhesives that have an overlap shear strength of at least about 3.5 MPa, more preferably at least about 5 MPa, and most preferably at least about 7 MPa.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition. In some embodiments, thin films may be provided, having thicknesses of less than 25 micrometers, or less than 10 micrometers.

EXAMPLES

All parts, percentages, ratios, etc. in the examples are by weight, unless noted otherwise. Solvents and other reagents used were obtained from Sigma-Aldrich Chemical Company; Milwaukee, Wis., unless specified differently.

Materials

Benzoxazine A: bis(3-phenyl-3,4-dihydro-2H,3-benzoxazinyl)isopropane, a bisphenol-derived benzoxazine, also called by the trade name ARALDITE™ MT35600 or XU3560 is available from Huntsman Corporation, The Woodlands, Tex.

JEFFAMINES™ D400, and D2000 are poly(oxyalkylenes) terminal diamines having molecular weights of about 400 and 2000, respectively. All JEFFAMINEs were obtained from Huntsman Corporation.

Benzoxazine B* was prepared using Benzoxazine B (a JEFFAMINE™ D400-based benzoxazine described below) and compounded with 25% by weight silicone-based core-shell particles) obtained from Kaneka Texas Corporation, Pasadena, Tex.

Benzoxazine A* was prepared using Benzoxazine A (60% wt), MEK (20% wt) and core-shell particles (20% wt) by Kaneka Texes Corp, as EPX™ MX 93X.

Paraloid™ 2600 core-shell particles are available from Dow Chemical, Midland, Mich.

TMMP, trimethylpropane tri-(3-mercaptopropionate) was obtained from Evans Chemetics Corporation, Lexington, Mass. 02173

TEMPIC™ trifunctional thiol obtained from Sakai Chemical Corporation/SC Organics, available through CBC America Corp., Commack, N.Y. 11725.

QX-11™ was obtained from Japan Epoxy Resin through CBC America Corp., Commack, N.Y. 11725

Shikoku P-d type benzoxazine was obtained from Shikoku Chemicals, Tokushima, Japan.

Test Methods

Cohesive Strength Method (Lap Shear Strength Testing)

Lap shear specimens were made using 4"×7"×0.063" (~25×178×1.6 mm) 7075 T6 bare aluminum that had been anodized according to Boeing Aircraft Company Specification BAC-5555. The anodization voltage was 22.5 volts. The specimen was generated as described in ASTM Specification D-1002-05.

A strip of approximately ½"×10 mils (~1.2×0.025 mm) of the benzoxazine adduct was applied to one edge of each of the two anodized aluminum adherends using a scraper. Three 5 mil diameter piano wires were used as spacers for bondline thickness control. The bond was closed and taped on the edge. The bond was placed between sheets of aluminum foil and pieces of cardboard. Two 14# steel plates were used to apply pressure to provide for adhesive spreading. The assembly was placed into an oven heated to 130° C. for 1 hour and the samples were then tested at room temperature after cooling or when they were hot as specified.

If the material had to be coated hot (as specified for specific examples), anodized 7075 T6 aluminum substrates and the shear sample knife (10 mil gap, ~0.025 mm) and the peel sample knife (10 mil gap) were all kept at 100° C. oven, and used to spread the adhesive immediately after their removal therefrom, using the T-peel and shear procedure detailed above. Furthermore, samples were coated with the adhesive while the adherends were placed on top of a hot plate surface kept at 100° C.

After the adhesive had been allowed to cool to room temperature, the larger specimen was cut into 1" wide samples, providing a ½ square inch bonded area. Six lap shear samples were obtained from each larger specimen. The bonds were tested to failure at room temperature on a Sintech Tensile Testing machine using a crosshead displacement rate of 0.1"/min. The failure load was recorded. The lap width was measured with a vernier caliper. The lap shear strengths are calculated as (2× failure load)/measured width. The average and standard deviation were calculated from the results of six tests. The lap shear strength was 2174 lbs/in$^2$ (~15 MPa).

T-Peel Test Method

T-peel values were measured using 4"×8"×0.025" 7075 T6 bare aluminum that had been anodized as described above. The test was as described in ASTM D-1876; Standard Test Method for Peel Resistance of Adhesives (T-Peel Test," Annual Book of ASTM Standards, vol. 15.06, pp. 115-117 (1995).

A strip of approximately 2"×5"×10 mil of adhesive prepared was applied to both of the two anodized aluminum adherends. 10 mil thick spacers made from brass shims were applied to the edges of the bonded area for bondline thickness control. The bond was closed and adhesive tape was applied to hold the adherends together during the cure. The adhesive bonds were placed between sheets of aluminum foil and also between pieces of cardboard. Four 14 pound steel plates were used to apply pressure to provide for adhesive spreading. The assembly was placed into an oven heated to 130° C. for 1 hour and the samples were then tested at room temperature after cooling or when they were hot as specified.

If the material had to be coated hot (as specified for specific examples), anodized 7075 T6 aluminum substrates and the shear sample knife (10 mil gap) and the peel sample knife (10 mil gap) were all kept at 100° C. oven, and used to spread the adhesive immediately after their removal therefrom, using the T-peel and shear procedure detailed above. Furthermore, samples were coated with the adhesive while the adherends were placed on top of a hot plate surface kept at 100° C.

After the adhesive had been allowed to cool to room temperature, the larger specimen was cut into 1" wide samples, yielding two 1" wide specimens. The bonds were tested to failure at room temperature on a Sintech Tensile Testing machine using a crosshead displacement rate of 12"/min. The initial part of the loading data was ignored. The average load was measured after about 1" was peeled. The T-peel strength is the average of three peel measurements.

Preparatory Example P1

P1 was prepared by combining a mixture of Jeffamine™ D-400 diamine (43 grams, 0.1 mol), paraformaldehyde (13.2 grams, 0.44 mol,) and phenol (18.8 grams, 0.2 mol) in a 2 L round bottom flask, equipped with a reflux condenser. Then the mixture was heated to 100° C. for 10 hours. The reaction mixture was allowed to cool and the water of condensation was removed under reduced pressure. The resulting product (approx 95% yield, structure confirmed by NMR) was used without any further purification.

Example 1

Part A of a two part coating composition was prepared by admixing 100 grams of ARALDITE™ MT35600 with 100 grams of P1. This mixture was heated to 130° C. for 30 minutes and vigorously stirred while cooling to approximately 70° C.

Part B of the coating composition was prepared by adding 27 grams of Paraloid™ 2600 core-shell particles into 133 grams of TMMP trifunctional thiol to prepare a 17 wt % core-shell toughened solution by stirring in core-shell particles added in portions at room temperature.

200 grams of Part A was placed into the first chamber of a twin pack mixing gun dispenser (ConProTec, Inc—Salem, N.H.) while 160 grams of Part B was placed in the second chamber of the same pack. This pack was then loaded into a dispensing gun whose two pistons were programmed to dispense the material in equimolar amounts into the mixing tip. Thus, Part A was dispensed approximately 1.7 times faster than Part B or conversely Part B was dispensed at ~0.6 the rate of Part A.

The contents of the twin pack were dispensed through a mixing tip directly in front of the knife between the two release liners, and the knife gap was set at 5 mils. The line was run at ~10 feet/minute to produce a partially tacky film. $^1$H NMR of the film had confirmed that essentially all of the JD400BZ material had reacted, while the aromatic Araldite™ MT 35600 benzoxazine stayed essentially intact.

This resulting film was then laminated between two pieces of anodized 7075 T6 aluminum (4"×7"×0.063" for shear testing and 4"×8"×0.020 for peel testing) and heated at 177° C. for 30 minutes. Shear and peel properties of this film were measured and are listed in table 1.

Example 2

Part A of a two part coating composition was prepared by heating 13.86 grams of Araldite™ MT 35600 heating to 100° C. for 30 minutes.

Part B of the coating composition was prepared by adding 3.42 grams of Paraloid™ 2600 core-shell particles into 7.98 grams of TMMP trifunctional thiol over a 5 hour period to prepare a 30 wt % core-shell toughened solution while stirring at room temperature. Parts A and B were heated to 80° C. and mixed together in a dynamic shear mixer. The mixture was then poured between two release liners and pulled through a knife coater heated to 80° C. and set at 5 mil gap. The product thus obtained was allowed to cool to room temperature to produce a colorless translucent film.

This resulting film was then laminated between two pieces of 7075 T6 anodized aluminum as in Example 1 and heated at 177° C. for 120 minutes. Shear and peel properties of this film were measured and are listed in table 1.

Example 3

Part A of a two part coating composition was prepared by heating 13.86 grams of Araldite™ MT 35600 heating to 100° C. for 15 minutes.

Part B was prepared by first adding 2.51 grams of Paraloid™ 2600 core-shell particles into 12.25 grams of QX-11™ to prepare a 17 wt % core-shell toughened solution. To this solution was added 1.65 grams of 17% Paraloid™ core-shell solution in TMMP prepared according to the procedure described for part B of example 1, and the mixture was admixed for approximately 5 minutes until visually uniform.

Parts A and B were heated to 80° C. and vigorously mixed together by hand for 15-30 seconds while hot. This mixture was then poured between two release liners (ClearSIL™ T10 release liner coated 2 mil PET from CP Films, Fieldale, Va.) and pulled through a knife coater heated to 110° C. and with the gap set to 0.005 inch mil (ca. 125 microns). The product obtained was allowed to cool to room temperature to produce a white brittle opaque film.

This film was then laminated between two pieces of anodized aluminum and heated at 177° C. for 120 minutes. Shear and peel properties of this film were measured and are listed in table 1.

Example 4

Part A of a two part coating composition was prepared by heating 10.86 grams of Shikoku P-d type benzoxazine—to 100° C.

Part B was prepared by first adding 2.25 grams of Paraloid™ 2600 core-shell particles with stirring to 11.03 grams of QX-11 to obtain a core-shell toughened solution. To this solution was added 0.8 grams of a mixture containing Paraloid™ 2600 core-shell (0.14 grams) and TMMP (0.665 grams) prepared according to the procedure described for part B of example 1 to obtain 14.1 grams of product. The film was obtained using the same procedure as in Example 3.

This film was then laminated between two pieces of anodized aluminum and heated at 177 C for 120 minutes following the same established testing procedures as in Example 2.

This resulting film was then laminated between two pieces of 7075 T6 anodized aluminum of same dimensions as in Example 1, and heated at 177° C. for 20 minutes. Shear and peel properties of this film were measured and are listed in table 1.

Example 5

Part A of a two part coating composition was prepared by heating 13.86 grams of Araldite™ MT 35600 heating to 100° C. for 30 minutes.

Part B was prepared by adding 2.32 grams of Paraloid™ 2600 core-shell particles to 11.34 grams of TEMPIC over 3 hours while stirring at room temperature to prepare a 17 wt % core-shell toughened solution.

Parts A and B were independently heated to 80° C. first, and then added together and mixed in a dynamic shear mixer for 15 seconds. The mixture was then poured between two release liners while it was still hot and pulled through a knife coater maintained 80° C. and with the gap set to 0.005 inch (ca. 125 microns). The product thus obtained was allowed to cool to room temperature to produce a translucent colorless film.

This resulting film was then laminated between two pieces of 7075 T6 anodized aluminum of same dimensions as in Example land heated at 177° C. for 120 minutes. Shear and peel properties of this film were measured and are listed in table 1.

Example 6

Part A of a two part coating composition was prepared by heating 13.86 grams of Araldite™ MT 35600 heating to 100° C. for 30 minutes.

Part B was prepared by adding 1.63 grams of Paraloid™ 2600 core-shell particles to 7.98 grams of TMMP over a period of 3 hours while stirring at room temperature to prepare a 17 wt % core-shell toughened solution.

Parts A and B were then heated to 80° C. and mixed together in a dynamic shear mixer for 15 seconds. This mixture was then poured between two release liners while still hot and pulled through a knife coater maintained at 80° C. with a gap setting of 0.005 inch (ca. 125 microns). The product thus obtained was allowed to cool to room temperature to produce a translucent colorless film.

This resulting film was then laminated between two pieces 7075 T6 anodized aluminum of same dimensions as in Example 1 and heated at 177° C. for 120 minutes. Shear and peel properties of this film were measured and are listed in table 1.

TABLE 1

| Example No | Overlap Shear Psi (MPa) | T-Peel Punds per inch width (N/dm) |
| --- | --- | --- |
| 1 | 3200 (22.1) | 40 (700) |
| 2 | 4650 (32.1) | 35 (612) |
| 3 | 2800 (19.3) | 20 (350) |
| 4 | 1600 (11) | 4.5 (79) |
| 5 | 2800 (19.3) | 5 (88) |
| 6 | 4000 (27.6) | 9 (158) |

The invention is illustrated by the following embodiments:
1. A method of preparing a benzoxazine-thiol polymer film comprising forming a rolling bank of a curable composition comprising a polybenzoxazine and a polythiol, wherein the rolling bank contacts first and second carrier substrates; passing the first and second substrates with the curable composition therebetween through a nip; and at least partially curing the curable composition to provide the corresponding polymeric layer.
2. The method of embodiment 1 wherein the first and second carrier substrates with the curable composition therebetween are passed through the nip under conditions sufficient to provide a layer of the curable composition.
3. The method of any of the previous embodiments wherein the corresponding curable composition is solvent-free.
4. The method of any of the previous embodiments wherein at least one of said first and second carrier substrates is a release liner.
5. The method of any of the previous embodiments comprising:
    providing a first metering element and a second metering element defining a nip gap therebetween;
    providing a first carrier substrate having a first width and a second carrier substrate having a second width;
    disposing the first and second carrier substrates between the first and second metering elements;
    forming a rolling bank between the first and second carrier substrates, wherein the rolling bank is medially disposed with respect to at least one of the first and second widths, comprises the curable composition, and has a first temperature;
    independently heating at least a portion, at least partially proximate the rolling bank, of at least one of the first and second metering elements to a second temperature;
    continuously passing, while disposed between the first and second carrier substrates, at least a portion of the curable composition of the rolling bank through the nip gap to form a thin reactive film sandwiched between the first and second carrier substrates; and
    at least partially curing the thin reactive film to provide the thin film sandwiched between the first and second carrier substrates.
6. The method of embodiment 5 wherein said at least one of the first and second metering elements is substantially uniformly heated.
7. The method of embodiments 5 or 6 wherein, contemporaneously, the second temperature is greater than or equal to the first temperature.

8. The method of any of embodiments 5-7 wherein at least one of the first and second metering elements comprises a rotatable roll.

9. The method of any of embodiments 5-8, wherein at least one of the first and second metering elements comprises a fixed bar.

10. The method of any of embodiments 5-9, wherein the thin reactive film has a thickness of less than or equal to 15 mils.

11. The method of any of embodiments 5-10, wherein at least one of the first and second carrier substrates comprises a release coating thereon adjacent to the thin film.

12. The method of any of embodiments 5-11, further comprising separating the first carrier substrate from the thin film.

13. The method of embodiment 12, further comprising separating the second carrier substrate from the thin film.

14. The method of any of the previous embodiments, wherein the polybenzoxazine is of the formula:

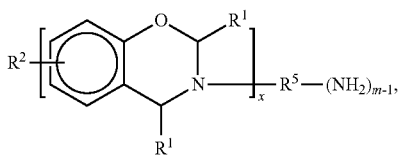

wherein
each of $R^1$ is H or an alkyl group;
$R^2$ is H, a covalent bond, or a polyvalent (hetero)hydrocarbyl group;
$R^5$ is the (hetero)hydrocarbyl residue of a primary amino compound having a valence of x,
m is 2-4; and
x is at least 1.

15. The method of any of the previous embodiments wherein the polbenzoxazine is of the formula:

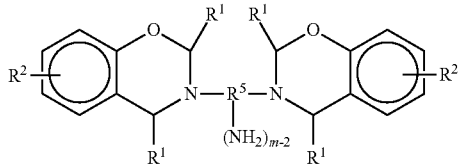

wherein
each of $R^1$ is H or an alkyl group;
$R^2$ is H, a covalent bond, or a divalent (hetero)hydrocarbyl group;
$R^5$ is the divalent (hetero)hydrocarbyl group, and
m is 2-4.

16. The method of embodiment 15 wherein $R^5$ is a poly(alkyleneoxy) group.

17. The method of any of the previous embodiments wherein the polbenzoxazine compound is of the formula:

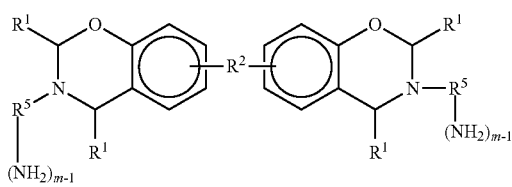

each of $R^1$ is H or an alkyl group;
$R^2$ is H, a covalent bond, or a divalent (hetero)hydrocarbyl group;
m is 2-4
$R^5$ is the (hetero)hydrocarbyl group.

18. The method of any of the previous embodiments wherein the polybenzoxazine compound is of the formula:

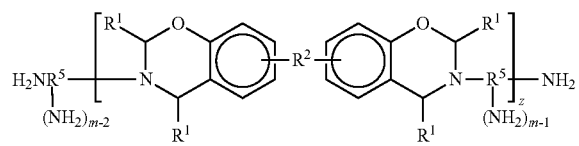

wherein,
each of $R^1$ is H or an alkyl group;
$R^2$ is H, a covalent bond, or a divalent (hetero)hydrocarbyl group;
m is 2-4;
$R^5$ is the divalent (hetero)hydrocarbyl residue of a primary diamino compound.

19. The method of any of the previous embodiments wherein the polythiol is of the formula $R^4$—$(S—H)_n$, where $R^4$ is an (hetero)hydrocarbyl having a valence of n, and n is 1 to 6.

20. The method of embodiment 19 wherein $R^4$ is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur.

21. The method of any of the previous embodiments, where the benzoxazine is derived from the reaction product of a phenol, an aldehyde and a primary amine.

22. The method of any of the previous embodiments, where the benzoxazine is derived from the reaction product of a bisphenol, an aldehyde and a primary amine.

23. The method of any of the previous embodiments, where the benzoxazine is derived from the reaction product of phenol, an aldehyde and a polyamine.

24. The method of embodiment 23, wherein the polyamine is a poly(ethyleneoxy) diamine.

25. The method of any of the previous embodiments wherein the partially cured curable composition comprises a polymer of the formula:

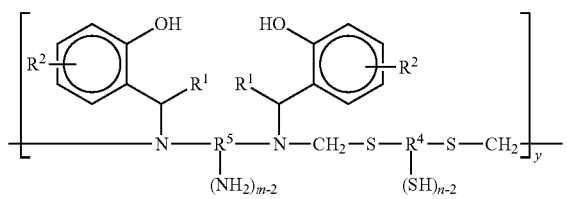

wherein
$R^1$ is H or an alkyl group;
$R^2$ is H, a covalent bond, or a divalent (hetero)hydrocarbyl group;
$R^4$ is (hetero)hydrocarbyl group of valence n and n is 2 to 6;
m is 2-4;
$R^5$ is a (hetero)hydrocarbyl group, and y is at least 2.

26. The method of any of the previous embodiments wherein the partially cured curable composition comprises a polymer of the formula:

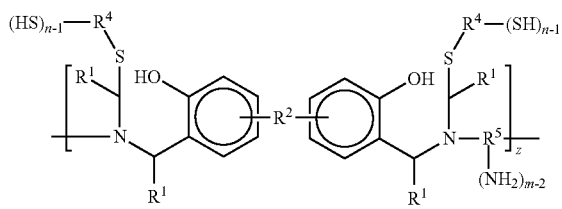

wherein
each $R^1$ is H or an alkyl group,
$R^2$ is H, a covalent bond, or a divalent (hetero)hydrocarbyl group;
$R^4$ is (hetero)hydrocarbyl group of valence n and n is 2 to 6;
$R^5$ is the (hetero)hydrocarbyl group;
m is 2-4 and
z is at least 2.

27. The method of any of the previous embodiments wherein the polybenzoxazine compound comprises a mixture of an N-aromatic polybenzoxazine compounds and an N-aliphatic polybenzoxazine compounds.

28. The method of embodiment 27 wherein the benzoxazine comprises
  a) 30 to 90 mole % of said N-aryl benzoxazine
  b) 10 to 70 mole % of said N-alkyl benzoxazine; and
  c) a stoichiometric equivalent of said thiol compound±15%.

29. The method of embodiment 27 wherein the first temperature is sufficient to initiate the curing of the N-aliphatic polybenzoxazine compounds with the polythiol.

What is claimed is:

1. A method of preparing a benzoxazine-thiol polymer film comprising forming a rolling bank of a curable composition comprising a polybenzoxazine and a non-polymeric polythiol, wherein the rolling bank contacts first and second carrier substrates; passing the first and second substrates with the curable composition therebetween through a nip forming a thin reactive film with a thickness of less than or equal to 15 mils (381 micrometers); and at least partially curing the curable composition to provide the corresponding polymeric film, wherein the polythiol is of the formula $R^4$—(S—H)$_n$, where $R^4$ is an (hetero)hydrocarbyl having a valance of n, and n is 2 to 6.

2. The method of claim 1, wherein the first and second carrier substrates with the curable composition therebetween are passed through the nip under conditions sufficient to provide a layer of the curable composition.

3. The method of claim 1, wherein the curable composition is solvent-free.

4. The method of claim 1, wherein at least one of said first and second carrier substrates is a release liner.

5. The method of claim 1, comprising:
  providing a first metering element and a second metering element defining a nip gap therebetween;
  providing a first carrier substrate having a first width and a second carrier substrate having a second width;
  disposing the first and second carrier substrates between the first and second metering elements;
  forming the rolling bank between the first and second carrier substrates, wherein the rolling bank is medially disposed with respect to at least one of the first and second widths, comprises the curable composition, and has a first temperature;
  independently heating at least a portion, at least partially proximate the rolling bank, of at least one of the first and second metering elements to a second temperature;
  continuously passing, while disposed between the first and second carrier substrates, at least a portion of the curable composition of the rolling bank through the nip gap to form the thin reactive film sandwiched between the first and second carrier substrates; and
  at least partially curing the thin reactive film to provide the thin film sandwiched between the first and second carrier substrates.

6. The method of claim 5, wherein said at least one of the first and second metering elements is substantially uniformly heated.

7. The method of claim 1, wherein, contemporaneously, the second temperature is greater than or equal to the first temperature.

8. The method of claim 1, wherein at least one of the first and second metering elements comprises a rotatable roll.

9. The method of claim 5, wherein at least one of the first and second metering elements comprises a fixed bar.

10. The method of claim 1, wherein at least one of the first and second carrier substrates comprises a release coating thereon adjacent to the thin film.

11. The method of claim 1, further comprising separating the first carrier substrate from the thin film.

12. The method of claim 11, further comprising separating the second carrier substrate from the thin film.

13. The method of claim 1, wherein the polybenzoxazine is of the formula:

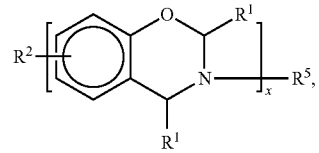

wherein
  each of $R^1$ is H or an alkyl group;
  $R^2$ is H, a covalent bond, or a polyvalent (hetero)hydrocarbyl group;
  $R^5$ is the (hetero)hydrocarbyl residue of a primary amino compound having a valence of x, and
  x is at least 1.

14. The method of claim 1, wherein the polybenzoxazine is of the formula:

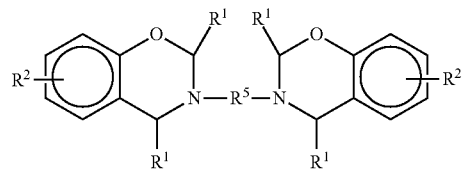

wherein
  each of $R^1$ is H or an alkyl group;
  $R^2$ is H, a covalent bond, or a divalent (hetero)hydrocarbyl group;
  $R^5$ is the divalent (hetero)hydrocarbyl group.

15. The method of claim 14, wherein $R^5$ is a poly (alkyleneoxy) group.

16. The method of claim 1, wherein the polybenzoxazine is of the formula:

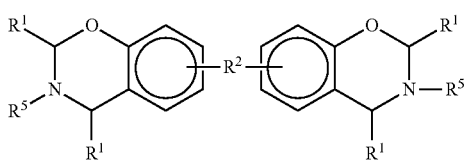

each of $R^1$ is H or an alkyl group;
$R^2$ is H, a covalent bond, or a divalent (hetero)hydrocarbyl group;
$R^5$ is the (hetero)hydrocarbyl group.

17. The method of claim 1, wherein the polybenzoxazine is of the formula:

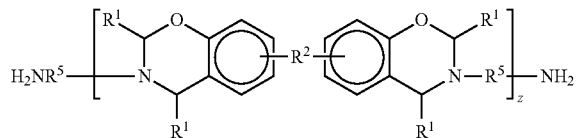

wherein,
each of $R^1$ is H or an alkyl group;
$R^2$ is H, a covalent bond, or a divalent (hetero)hydrocarbyl group;
$R^5$ is the divalent (hetero)hydrocarbyl residue of a primary diamino compound.

18. The method of claim 1, wherein $R^4$ is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur.

19. The method of claim 1, where the benzoxazine is derived from the reaction product of a phenol, an aldehyde and a primary amine.

20. The method of claim 1, where the benzoxazine is derived from the reaction product of a bisphenol, an aldehyde and a primary amine.

21. The method of claim 1, where the benzoxazine is derived from the reaction product of phenol, an aldehyde and a polyamine.

22. The method of claim 21, wherein the polyamine is a poly(ethyleneoxy) diamine.

23. The method of claim 5, wherein the partially cured curable composition comprises a polymer of the formula:

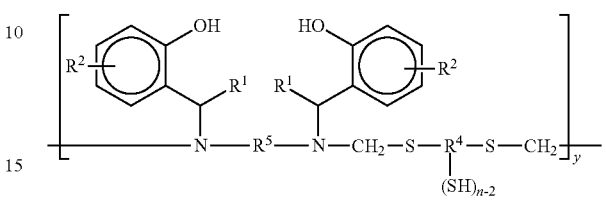

wherein
$R^1$ is H or an alkyl group;
$R^2$ is H, a covalent bond, or a divalent (hetero)hydrocarbyl group;
$R^4$ is (hetero)hydrocarbyl group of valence n and n is 2 to 6;
$R^5$ is a (hetero)hydrocarbyl group, and y is at least 2.

24. The method of claim 5, wherein the polybenzoxazine compound comprises a mixture of an N-aromatic polybenzoxazine compounds and an N-aliphatic polybenzoxazine compounds.

25. The method of claim 24, wherein the benzoxazine comprises
a. 30 to 90 mole % of said N-aryl benzoxazine
b. 10 to 70 mole % of said N-alkyl benzoxazine; and
c. a stoichiometric equivalent of said thiol compound±15%.

26. The method of claim 24, wherein the first temperature is sufficient to initiate the curing of the N-aliphatic polybenzoxazine compounds with the polythiol.

* * * * *

UNITED STATES PATENT AND TRADEMARK OFFICE
CERTIFICATE OF CORRECTION

PATENT NO. : 9,840,591 B2  
APPLICATION NO. : 13/813306  
DATED : December 12, 2017  
INVENTOR(S) : Ilya Gorodisher Page 1 of 1

It is certified that error appears in the above-identified patent and that said Letters Patent is hereby corrected as shown below:

On the Title Page

Column 1,
Line 2, in the title, delete "POLYMERS" and insert -- POLYMER --, therefor.

In the Specification

Column 1,
Line 2, delete "POLYMERS" and insert -- POLYMER --, therefor.

Column 2,
Line 59, delete "—$(C_2H_{40})H_{1-20}$—$C_2H_4$—." and insert -- —$(C_2H_4O)_{1-20}$—$C_2H_4$—. --, therefor.

Column 14,
Line 20, delete "Texes" and insert -- Texas --, therefor.

Column 17,
Line 50, delete "land" and insert -- 1 and --, therefor.

Signed and Sealed this
Thirteenth Day of February, 2018

Andrei Iancu
*Director of the United States Patent and Trademark Office*